(12) United States Patent
DeWitt

(10) Patent No.: US 11,631,264 B2
(45) Date of Patent: *Apr. 18, 2023

(54) COMMUNICATIONS SYSTEM

(71) Applicant: COIN LION LLC, Sioux Falls, SD (US)

(72) Inventor: Joshua Wesley DeWitt, Sioux Falls, SD (US)

(73) Assignee: COIN LION LLC, Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,867

(22) Filed: Sep. 4, 2022

(65) Prior Publication Data

US 2022/0415073 A1    Dec. 29, 2022

Related U.S. Application Data

(63) Continuation of application No. 17/168,272, filed on Feb. 5, 2021, now Pat. No. 11,436,850, which is a continuation of application No. 16/020,995, filed on Jun. 27, 2018, now Pat. No. 10,915,745.

(51) Int. Cl.
    *G06V 30/40*      (2022.01)
    *G06V 30/413*     (2022.01)
    *G06V 30/416*     (2022.01)
    *G06F 18/25*      (2023.01)

(52) U.S. Cl.
    CPC ............ *G06V 30/40* (2022.01); *G06F 18/256* (2023.01); *G06V 30/413* (2022.01); *G06V 30/416* (2022.01)

(58) Field of Classification Search
    CPC .......... G06K 9/00456; G06K 9/00469; G06K 9/6293
    See application file for complete search history.

(56) References Cited

U.S. PATENT DOCUMENTS

| | | | |
|---|---|---|---|
| 2011/0061005 A1* | 3/2011 | Zha ..................... | H04L 12/1818 715/753 |
| 2012/0284747 A1* | 11/2012 | Joao .................... | H04N 21/6581 725/32 |
| 2015/0058418 A1* | 2/2015 | Singh .................. | G06F 21/6218 709/204 |
| 2018/0074784 A1* | 3/2018 | Tsukada ................... | H04R 3/12 |

* cited by examiner

*Primary Examiner* — Joshua D Taylor

(57) ABSTRACT

An electronic communications method, includes receiving, by a computing device, first electronic information associated with generated a graphical feature in a graphical user interface. The electronic communications method further includes generating, by the computing device, the graphical feature. The electronic communications method further includes sending, by the computing device, the graphical feature to another computing device. The electronic communications method further receiving, by the computing device, second electronic information to classify the graphical feature as public information. The electronic communications method further includes sending, by the computing device, the graphical feature to a third computing device based on the classification of the graphical feature as public information.

19 Claims, 14 Drawing Sheets

| ID (902) | PRIVACY LEVEL (904) | TOKEN TYPE (906) | SOCIAL NETWORKS (908) |
|---|---|---|---|
| A2C | PUBLIC | CL, ETX, RR1 | ABC |
| K8Y | PRIVATE | ETX | NULL |
| 9V7 | 50% PRIVATE | TU2, CL | ABC, XYZ |
| ● | ● | ● | ● |
| ● | ● | ● | ● |

FIG. 9

COMMUNICATIONS SYSTEM

BACKGROUND

In an electronic communications system, a user may wish to electronically initiate one or more electronic communications to share electronic content with other users on other electronic systems. The user may share the electronic content to convince other users that the electronic communications conducted by the user should also be conducted by the other users. There is currently no system that allows for the sharing of electronic content and electronic communications in a manner that allows for a duplication of the actions of the user by other users.

BRIEF DESCRIPTION OF DRAWINGS

FIG. 9 is an example database structure for information associated with communication features;

DETAILED DESCRIPTION OF PREFERRED EMBODIMENTS

Figure 1A:
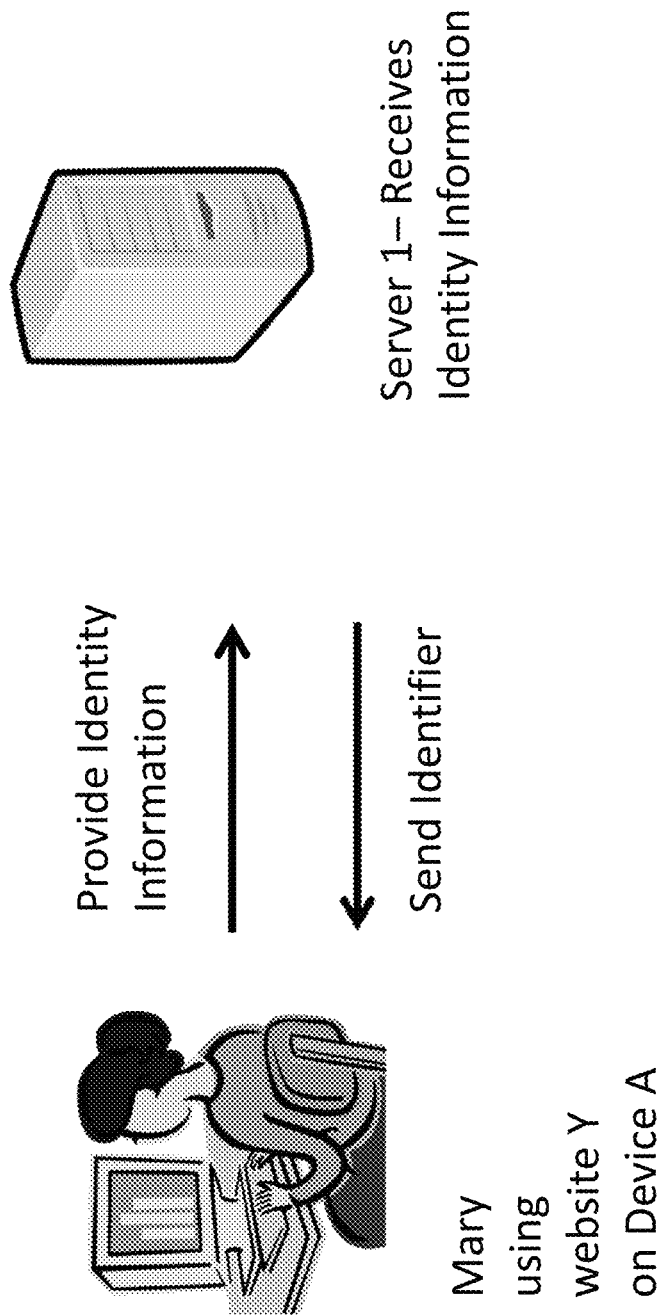
FIGS. 1A-1B are diagrams of an example environment in which systems and/or methods described herein may be implemented.

The following detailed description refers to the accompanying drawings. The same reference numbers in different drawings may identify the same or similar elements.

Systems, devices, and/or methods described herein may allow for a user, using an electronic application implemented on a computing device (e.g., smartphone, laptop, etc.) to generate various electronic communication features and/or electronic communications with other users to generate a network of users that interact with each other via the electronic application. In embodiments, the electronic application may generate one or more electronic graphical user interfaces that allow for electronic information to be displayed in various forms (e.g., graphical, textual, etc.). In embodiments, the electronic application may include additional electronic features that allow for a user to share electronic transactions, associated with the electronic application, with other users; and, for other users to share their electronic transactions with the user. Thus, a user may change the patterns and quantity of electronic communications of other users using the electronic application.

In embodiments, the electronic application may receive electronic information about electronic tokens that can be used for electronic transactions that are associated with electronic information displayed in one or more electronic graphical user interfaces. In embodiments, the electronic information may be obtained from a blockchain (or other type of electronic peer-to-peer transaction system) and may be obtained without adding any additional features or information (e.g., additional blocks) to the blockchain. In alternate embodiments, the electronic application may be associated with an electronic device and/or system that generates electronic tokens via one or more computing processes associated with a cryptologic electronic process and that are generated by the electronic application (and associated servers and systems) and not generated by a third-party computing device. In embodiments, the electronic tokens may be used to generate various electronic communications and features via the electronic graphical user interfaces associated with the electronic application. In embodiments, the electronic application may include different types of electronic tokens that may be used to generate various electronic communication features via the electronic graphical user interfaces.

In embodiments, the electronic application may allow for a user to generate an one or more electronic features about the electronic tokens that can be electronically shared with other electronic applications. Furthermore, in embodiments, the electronic applications may receive generated electronic features from another user (either on the same electronic application or from a different electronic application) that can be used to change electronic features, electronic tokens, and the quantity and/or types of electronic communications associated with the user.

Accordingly, by using the systems, methods, and/or processes described in the following figures, a user may generate one or more electronic graphical features and/or information via an electronic application that can be shared with other users who may then use the generated electronic graphical features and/or information to electronically change other generated electronic graphical features. Furthermore, the electronic application may generate and/or be associated (e.g., electronic information) with a particular electronic token. As such, the particular electronic token can be used to generate graphical features that change over time on another server and/or system (e.g., a blockchain) without having to electronically interact with the blockchain. Alternatively, or additionally, electronic interactions may occur with electronic transactions with a blockchain by requests made via the electronic application and generated by the same computing device that generates electronic information for the electronic application. Accordingly, the systems, methods, and/or processes described in the following figures allow for electronic communications and transactions to occur with a particular type of electronic token and also allow for generating an electronic communications network that allows for multiple users to electronically update electronic features based on other user's electronic features (e.g., graphical features, value features, etc.). In doing so, the systems, methods, and/or processes described in the following figures allow for social integration, electronic token transactional services, and graphical features that simultaneously change based on the social integration and electronic token transactional services.

Figure 1B:
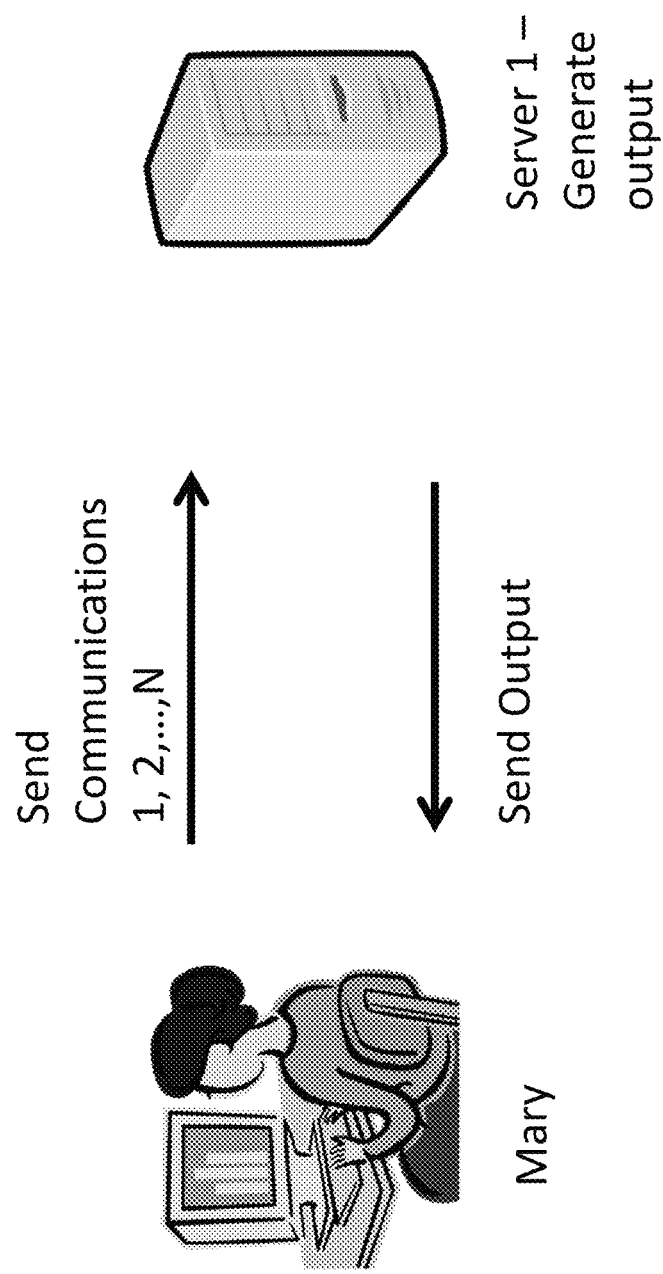

FIGS. 1A-1B describe one or more example processes for electronically generating graphical and other electronic information for display on a computing device. In this non-limiting example, Mary is using device A to access Website Y. While shown as desktop device, device A may be a smartphone, a laptop, a cellphone, and/or any other type of computing device. In embodiments, Website Y may be a webpage, an electronic application, or other electronic interface that permits a user to provide electronic information via Device A. As shown in FIG. 1A, the user enters her identity information (e.g., name, social security number, home address, etc.) into Website Y via Device A. In embodiments, Website Y may send the identity information to Server 1. In embodiments, Server 1 may generate an identifier that is sent back to device A and displayed via Website Y. In embodiments, the identifier may permit Mary to use Website Y to conduct one or more electronic communications and/or transactions.

Accordingly, once Mary has the identifier, she may then use Website Y to send one more communications through Website Y. As shown in FIG. 1B, Mary sends a number of communications that are shown as from 1 to N. In embodiments, Server 1 may receive the number of communications and generate an output that is sent back to Website Y. In embodiments, the output may be generated in various different electronic forms. In embodiments, the output can be changed based on further electronic transactions. For example, Mary may initiate an electronic communication that includes a request for information about electronic tokens that are part of a blockchain that were electronically obtained by Mary at a previous time. In embodiments, electronic information about electronic tokens is obtained by Server 1, or another computing device, and electronically communicated to Website Y. In embodiments, Website Y may then electronically generate a graphical user interface based on the electronic information about the electronic tokens which may be changing in one or more electronic features and may cause electronic changes to the graphical user interface. Alternatively, or additionally, Server 1 may electronically generate or obtain electronic tokens and where electronic information about the electronic tokens is then electronically communicated to Website Y.

Figure 2:
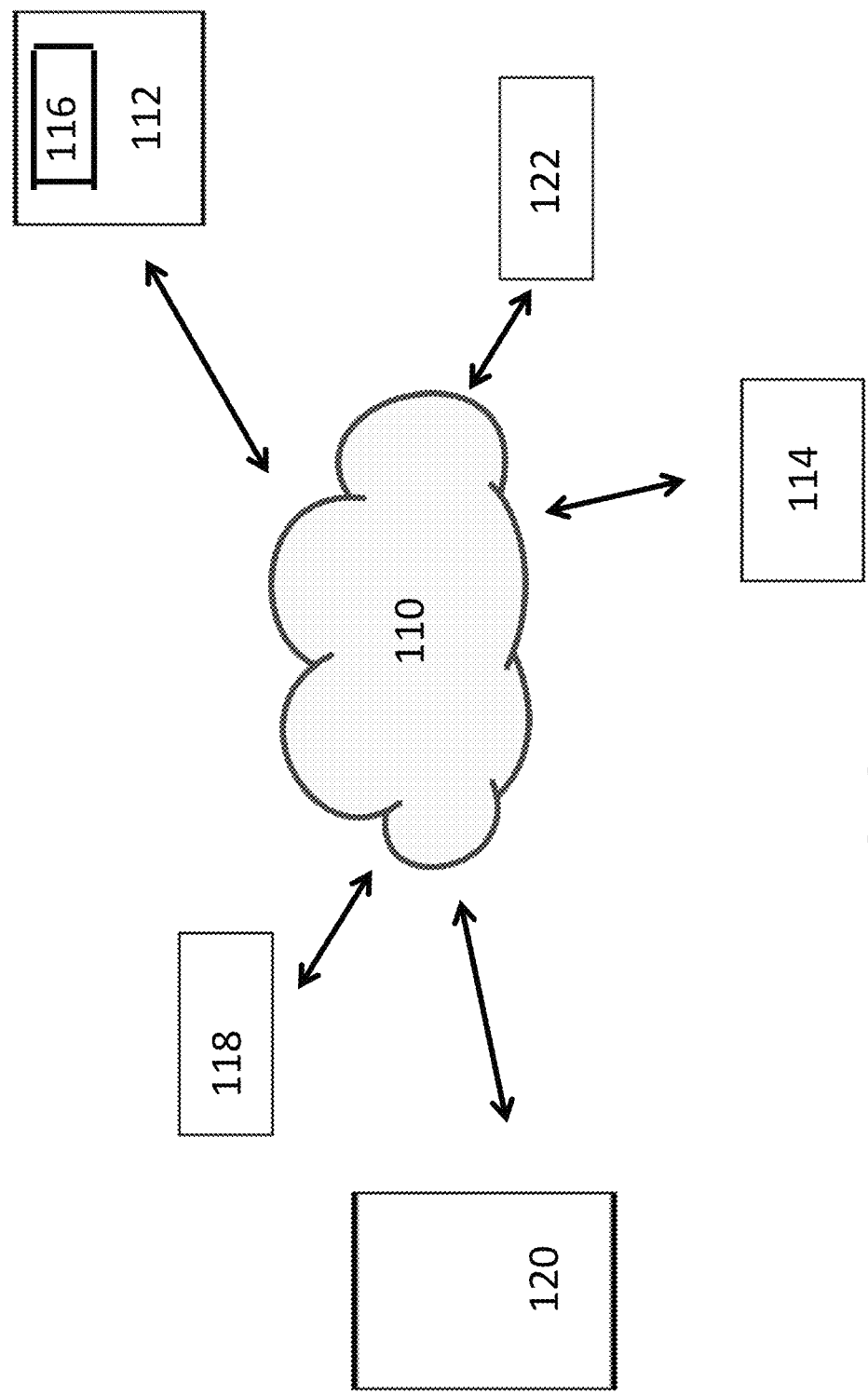
FIG. 2 is a diagram of a network environment.

FIG. 2 is a diagram of example environment 100 in which systems, devices, and/or methods described herein may be implemented. FIG. 1 shows network 110, user device 112, user device 114, electronic application 116, server 118, and System 120.

Network 110 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another network. In embodiments, network 110 may allow for devices describe any of the described figures to electronically communicate (e.g., using emails, electronic signals, URL links, web links, electronic bits, fiber optic signals, wireless signals, wired signals, etc.) with each other so as to send and receive various types of electronic communications.

User device 112 and/or 114 may include any computation or communications device that is capable of communicating with a network (e.g., network 110). For example, user device 112 and/or user device 114 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 112 and/or 114 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 112 and/or 114. User device 112 and/or 114 may have a touch screen and/or a keyboard that allows a user to electronically interact with an electronic application. In embodiments, a user may swipe, press, or touch user device 112 and/or 114 in such a manner that one or more electronic actions will be initiated by user device 112 and/or 114 via an electronic application.

User device 112 and/or 114 may include a variety of applications, such as, for example, a verification application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.).

Electronic application 116 may be capable of interacting with user device 112, user device 114, server 118, and/or system 120 to automatically and electronically analyze electronic information and determine whether to electronically verify information associated with one or more persons. In embodiments, electronic application 116 may obtain electronic information about different types and quantities of electronic tokens. In embodiments, electronic application 116 may generate graphical and alphanumeric features based on electronic communications and transactions associated with the electronic tokens. In embodiments, electronic application 116 may interact with other electronic applications (e.g., associated with server 118). In embodiments, electronic application 116 may interact with application programming interfaces (APIs) to obtain electronic information from other electronic applications. In embodiments, electronic application 116 may be electronically configured to show photos, video, text, icons, graphical images, buttons, emojis, and/or any other electronic information. While FIG. 2 shows electronic application 116 on user device 112, electronic application 116 can also be stored on user device 114, and/or server 118.

Server 118 may include one or computational or communication devices that gather, process, store, and/or provide information relating to one or more web pages or electronic pages that electronically display electronic content (e.g., advertisements, posts, messages, video content) associated with the one or more services. In embodiments, server 118 may be a web server associated with electronic application 116.

System 120 may include one or more computational or communication devices that gather, process, store, and/or provide information that generate and/or receive electronic information about electronic tokens. In embodiments, system 120 may generate graphical features in electronic application 116. In embodiments, system 120 may generate electronic information about electronic tokens or generate electronic tokens (e.g., bitcoins and other types of cryptocurrencies) themselves. Server 122 may include one or more computational or communication devices that gather, process, store, and/or provide information relating to one or more web pages or electronic pages generated by a webpage that is not generated by electronic application 116. In embodiments, server 122 may generate electronic tokens and be associated with a blockchain not generated by server 118 or system 120.

While FIG. 2 shows electronic application 116, there may be multiple different types of electronic applications 116 that each has their own server(s) that are similar to server 118.

Figure 3:
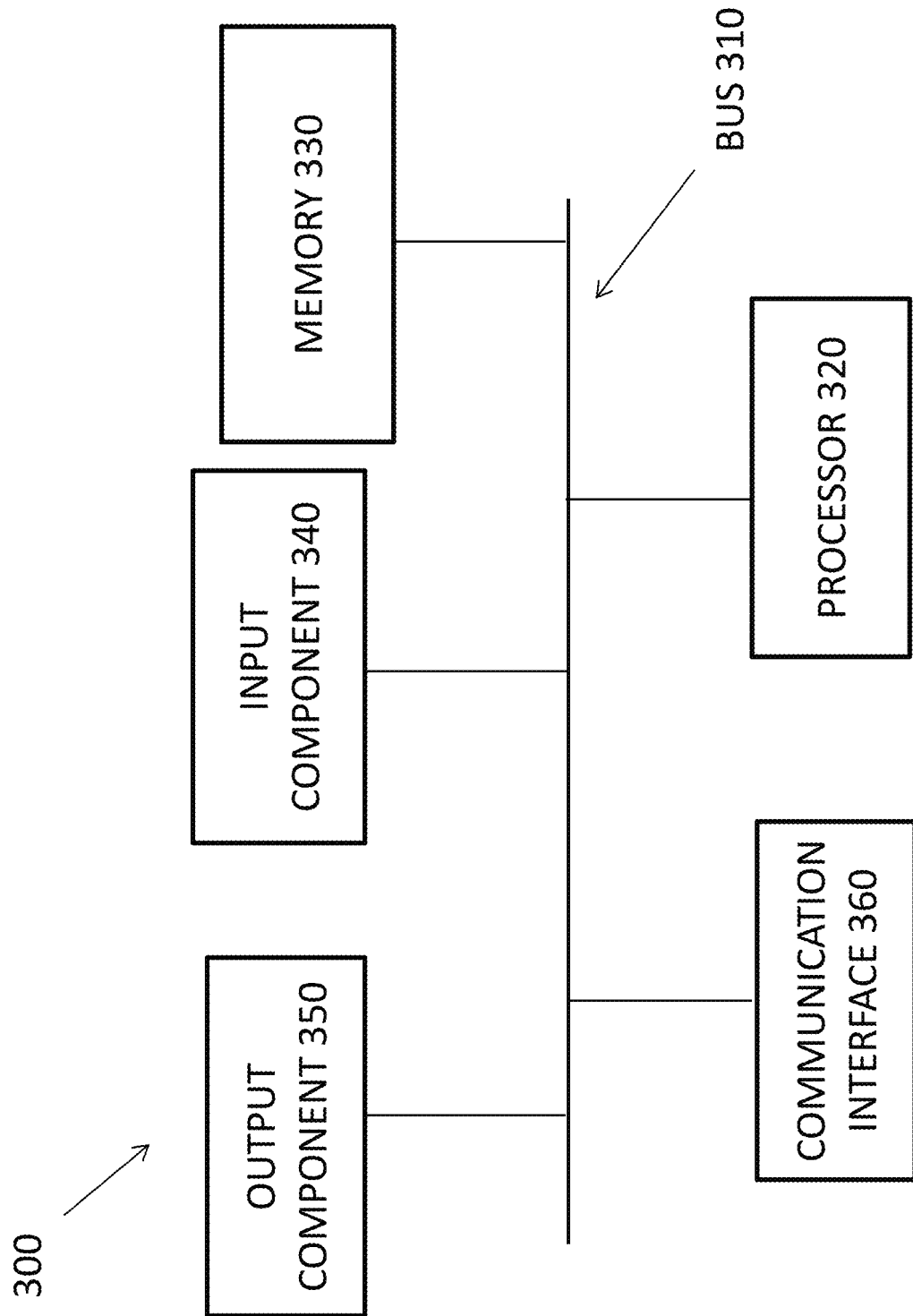
FIG. 3 is a diagram of an example computing device.

FIG. 3 is a diagram of example components of a device 300. Device 300 may correspond to user device 112, user device 114, server 118, system 120, and server 122. Alternatively, or additionally, user device 112, user device 114, server 118, system 120, and server 122 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 110.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
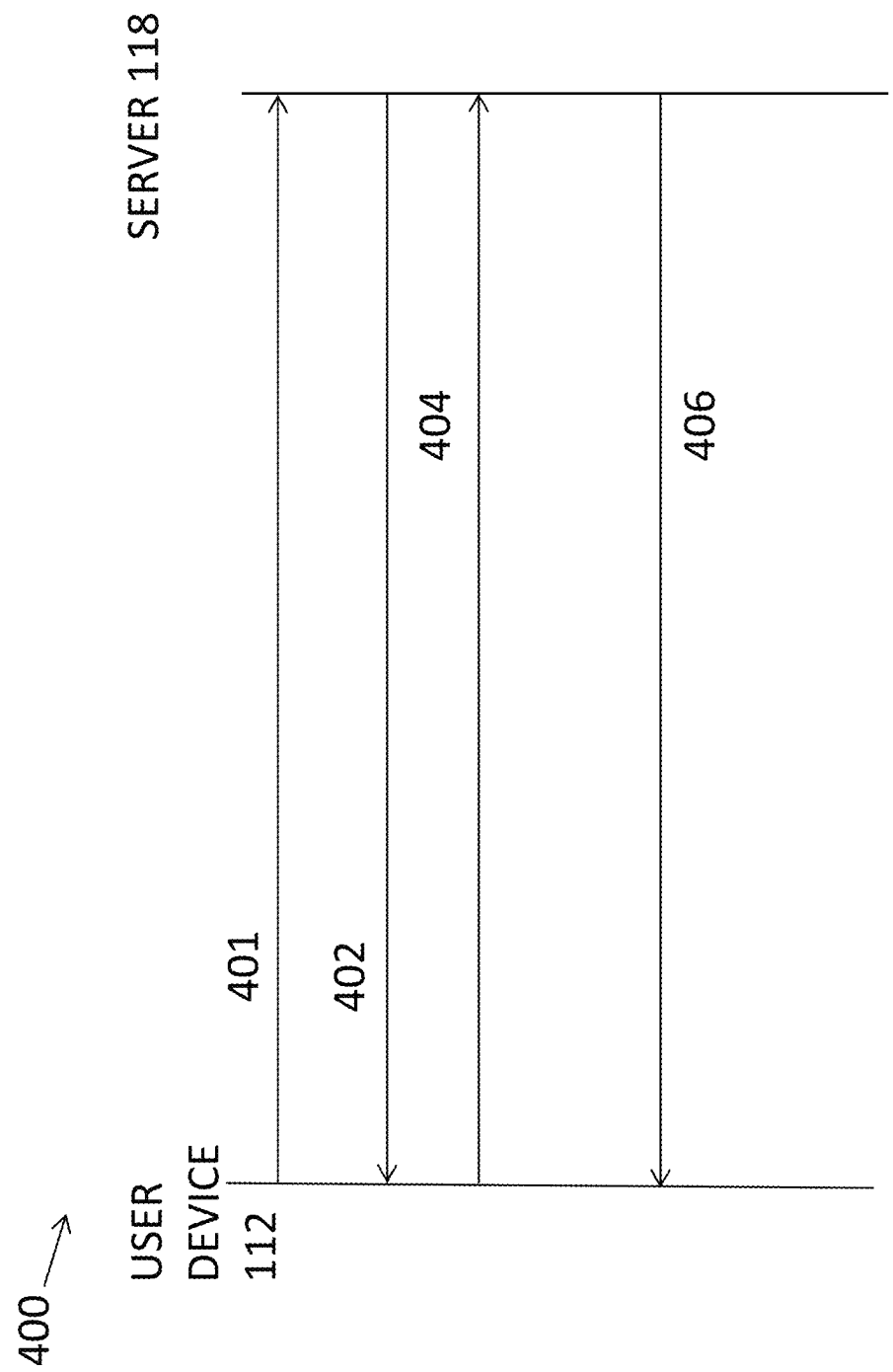
FIGS. 4 and 5 are flow diagrams of example communications to generate one or more communication features.

FIG. 4 describes an example communication flow process 400 for generating and sharing electronic features. As shown, FIG. 4 includes user device 112 and server 118. In embodiments, as shown in FIG. 4, user device 112 may electronically communicate with server 118 with electronic communication 401. In embodiments, electronic communication 401 may include electronic information to create an electronic account associated with server. In embodiments, electronic communication 401 may include name information, address information (e.g., street address, city, country, etc.), age, income level, social security number, and/or any other information. In embodiments, server 118 may receive electronic communication 401 and generate an identifier that allows the user of user device 112 to use an electronic application (e.g., electronic application 116). In embodiments, electronic communication 401 may include a monetary value that can be used to purchase electronic tokens generated by server 118. In alternate embodiments, electronic communication 401 may include a monetary value that can be used to purchase electronic tokens generated by server 118. In embodiments, server 118 may be part of an exclusive computing network that has its own security requirements when communicating with other devices. Furthermore while FIG. 4 shows server 118, system 120 may also conduct one or more of the communications described in FIG. 4.

In embodiments, server 118 may send the identifier to user device 112 in electronic communication 402. In embodiments, the user of user device 112 may use the identifier to access an electronic account associated with electronic application 116. In embodiments, the user, using electronic application 116, may generate one or more electronic features (e.g., graphical and alphanumeric features) via a graphical user interface that is associated with the identifier. In embodiments, the graphical user interface may include different electronic features, such as line graphs, pie charts, block graphs, news information, electronic token information, and/or hyperlinks (or other types of links) that allow for electronic transactions for different types of electronic tokens. In embodiments, one or more graphs may show an aggregate of different electronic tokens associated with a particular identifier.

In embodiments, the user may select an additional electronic feature that makes the one or more electronic features as public or private. In embodiments, if the user decides to make the one or more features as public, the user may be given additional options. In embodiments, the additional options may include the option to also receive one or more electronic features from other users of electronic application 116 or another electronic application. Upon selecting to make the one or more electronic features public, as shown in FIG. 4, user device 112 may send electronic communication 404 to server 118. In embodiments, server 118 may receive electronic communication 404 and electronically display on a webpage, or another electronic application (or website), associated with server 118, the one or more electronic features generated by the user via electronic application 116 on user device 112. In embodiments, other users of webpages, or electronic pages, associated with server 118 may view the one or more electronic features and (1) update their own electronic features (e.g., graphical features, alphanumeric features, etc.) associated with electronic application 116, and/or (2) provide electronic information to the user to update the one or more electronic features on electronic application 116.

As shown in FIG. 4, server 118 may send electronic communication 406 which includes electronic information to update the one or more electronic features. In embodiments, electronic communication 406 may include information generated by other users. In embodiments, electronic communication 406 may include information to update one or more graphs and/or other electronic features electronically displayed via electronic application 116 and associated with a particular identifier.

Figure 5:
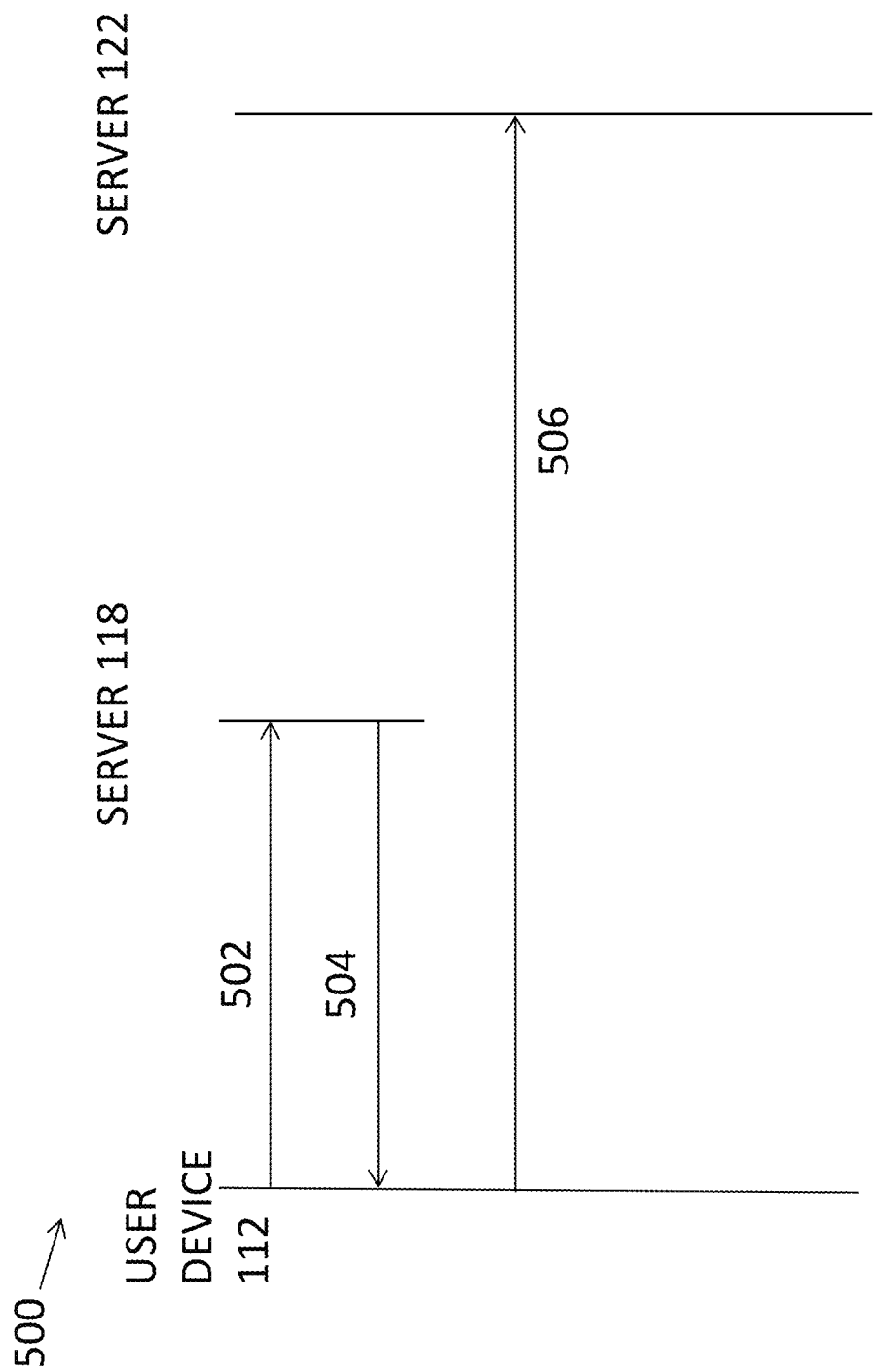

FIG. 5 describes an example communication flow process 500 for generating electronic features and sharing the electronic features. As shown, FIG. 5 includes user device 112, server 118, and system 120. In embodiments, as shown in FIG. 5, user device 112 may electronically communicate with server 118 with electronic communication 502. In embodiments, electronic communication 502 may include electronic information to create an electronic account associated with server. In embodiments, electronic communication 502 may include name information, address information (e.g., street address, city, country, etc.), age, income level, social security number, and/or any other information. In embodiments, server 118 may receive electronic communication 502 and generate an identifier that allows the user of user device 112 to use an electronic application (e.g., electronic application 116). In embodiments, electronic communication 502 may include a monetary value that can be used to purchase electronic tokens generated by server 118. Furthermore while FIG. 5 shows server 118, system 120 may also conduct one or more of the communications described in FIG. 4.

In embodiments, server 118 may send the identifier to user device 112 in electronic communication 504. In embodiments, the user of user device 112 may use the identifier to access an electronic account associated with electronic application 116. In embodiments, the user, using electronic application 116, may generate one or more electronic features (e.g., graphical and alphanumeric features) via a graphical user interface that is associated with the identifier. In embodiments, the graphical user interface may include different electronic features, such as line graphs, pie charts, block graphs, news information, electronic token information, and/or hyperlinks (or other types of links) that allow for electronic transactions for different types of electronic tokens. In embodiments, the graphical user interface may include multimedia content such as videos and audio that can be shared with other users of electronic application 116 and/or other types of electronic applications. In embodiments, the graphical user interface may include electronic links to one or more electronic tokens associated with initial coin offerings. In embodiments, selection of an electronic link may result in server 118, system 120, or another server, to obtain electronic information about electronic tokens associated with a blockchain (or other type of peer-to-peer transaction system) without having to electronically add a block to the blockchain or create an additional electronic action on the blockchain itself. In alternate embodiments, selection of an electronic link may result in server 118, system 120, or another server to generate electronic tokens.

In embodiments, the user may select an additional electronic feature that makes the one or more electronic features as public or private. In embodiments, if the user decides to make the one or more features as public, the user may be given additional options. In embodiments, the additional options may include the option to also receive one or more electronic features from other users of electronic application 116. In embodiments, the user decides not to receive one or more electronic features from other users of electronic application 116. Upon selecting to make the one or more electronic features public, but not to receive one or more other electronic features form other users, as shown in FIG. 5, user device 112 may send electronic communication 506 to server 122 which then allows server 122 to electronically generate, on another webpage not generated by server 118, information about electronic transactions occurring on server 118 and/or system 120.

In embodiments, the electronic communications shown in FIGS. 4 and 5 may be sent as a short message service (SMS), a multimedia message service (MMS), an email, a phone call, and/or any other type of electronic message. In embodiments, one or more of the electronic communications shown in FIGS. 4 and 5 may include electronic information associated with password, instructions, icons, and/or links (e.g., hyperlinks) that may be displayable on an electronic screen associated with user device 112 or any other computing device described in FIG. 2.

Figure 6:
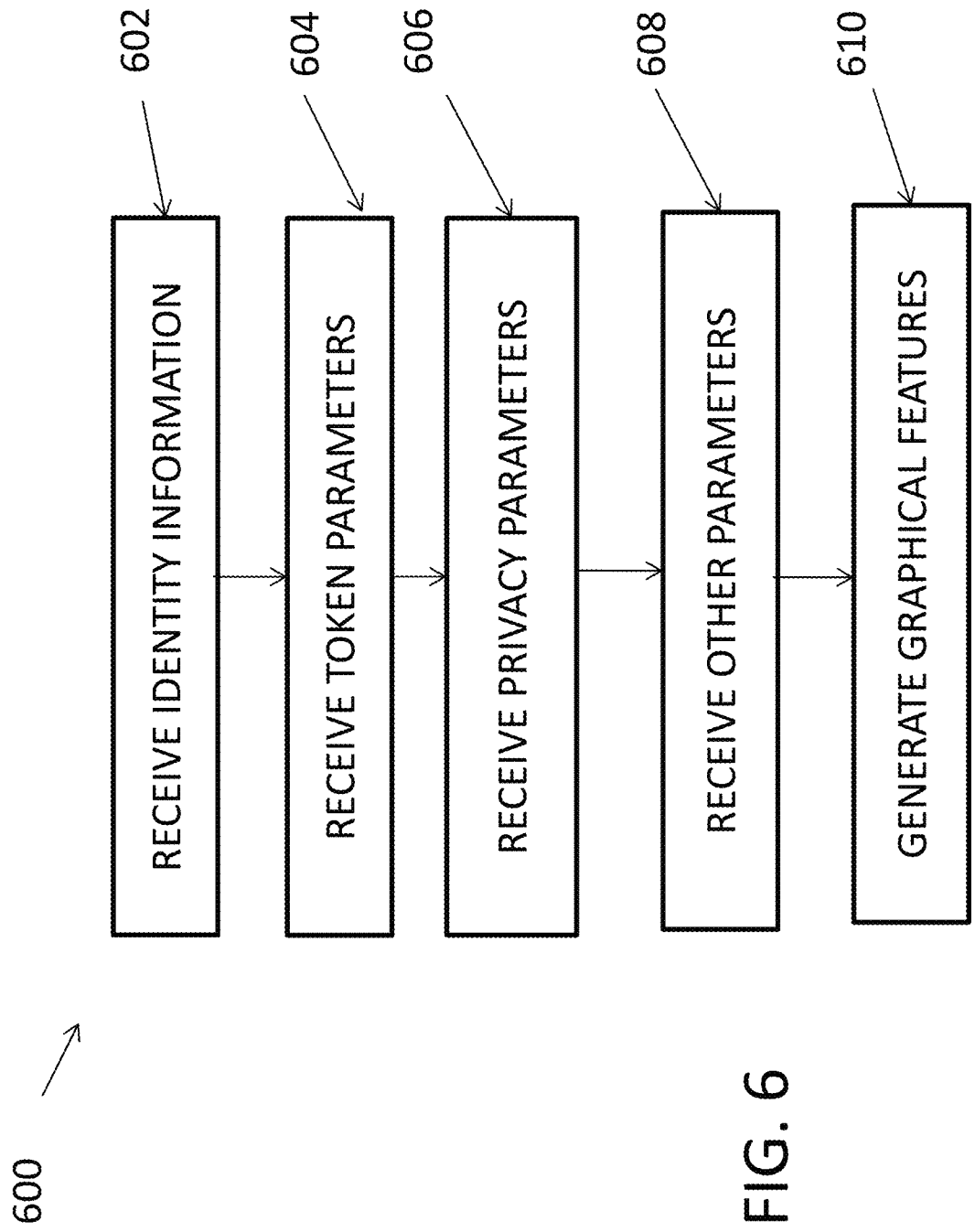
FIG. 6 is a flow chart of an example process for receiving parameters and generating communication features.

FIG. 6 is a flow chart of an example process 600 for generating electronic information via a graphical user interface. In embodiments, example process 600 may be performed by electronic application 116, user device 112, and/or server 118. At step 602, user device 112 and/or electronic application 116 may receive identity information associated with a user of electronic application 116. In embodiments, identity information may include name information, address information (e.g., street address, city, country, etc.), age, income level, social security number, and/or any other information. In embodiments, user device 112 and/or electronic application 116 may generate an identifier and password or send the information to another device (e.g., server 118) which generates the identifier and password. In embodiments, the identifier and password may be used by the user to generate one or more features via a graphical user interface associated with electronic application 116.

At step 604, user device 112 and/or electronic application 116 may receive token parameters. In embodiments, the user of electronic application 116 may have previously obtained electronic tokens on a blockchain (or other system) which they wish to electronically display via electronic application 116. In embodiments, the token parameters may be received by electronic application 116 electronically obtaining electronic information about electronic tokens associated with a blockchain from another system or server without having to add a block to the blockchain or an additional transaction with the blockchain. In alternate embodiments, the user may purchase a quantity of electronic tokens from electronic application 116. In embodiments, the quantity of electronic tokens purchased from electronic application 116 are electronic tokens that are a type of cryptocurrency that have a particular data quantity (e.g., memory size in bits), a financial value (e.g., the generated token can be converted into a financial value such as Japanese Yen, Chinese Yuan, and/or other financial currency values.

In embodiments, the electronic token may also have a particular financial value that can be converted into another type of electronically generated token. In embodiments, the electronic token's financial value can change over time (e.g., can increase or decrease in value). In embodiments, any change to the electronic token's financial value may change the electronic storage requirements of the electronic token. In embodiments, any change to the electronic token's financial value may change electronic graphical features in the graphical user interface associated with electronic application 116.

In alternate embodiments, any purchase of the electronic token may not require additional electronic communications between electronic application 116 (and associated servers, such as server 118) and other servers electronic transfer of the electronic tokens. Rather, the electronic token is generated by the same server (e.g., server 118) or a system (e.g., system 120) that also electronically generates the graphical user interface (including graphical, alphanumeric, and other electronic displayable features) and also provides electronic controls and settings for electronic application 116.

At step 606 user device 112 and/or electronic application 116 may receive privacy parameters. In embodiments, the privacy parameters may include information regarding whether to make information associated with a particular identifier as public or private information. In embodiments, a privacy parameter indicating public information may result in one or more electronic communications from user device 112 and/or electronic application 116 being sent to server 118. In embodiments, a privacy parameter indicating public information may result in one or more electronic communications from user device 112 and/or electronic application 116 being sent to another user device 112 where electronic application 116 is being used. In embodiments, In embodiments, with information classified as public information, information such as graphical and alphanumeric information displayed via a graphical user interface can be shared on other computing devices. In embodiments, users that are electronically receive the public information may electronically transfer electronic tokens, or information about electronic tokens, from one electronic application (that may or may not be generated by server 118) to an electronic page associated with the identifier. In embodiments, electronic application 116 may provide a user to select particular electronic information as public and other electronic information as private. In embodiments, the user may select one aggregation of electronic tokens as public and select another aggregation of electronic tokens as private. In embodiments, if one aggregation of electronic tokens is made public, electronic application 116 may receive electronic communications that may change electronic features associated with the public aggregation of electronic tokens and also may change electronic features that are associated with a private aggregation of electronic tokens. In embodiments, publicly classified electronic information may result in electronic changes in electronic token quantities and associated changes to memory storage capacity levels associated with server 118. In embodiments, the electronically transferred tokens can be used for electronically changing one or more features displayed on the graphical user interface.

In embodiments, a privacy parameter indicating private information may result in no electronic communications from user device 112 and/or electronic application 116 being sent to another user device 112 and/or server 118. Accordingly, private information is not electronically shared.

At step 608, user device 112 and/or electronic application 116 may receive other parameters. In embodiments, the other parameters may include information about how to allocate electronic tokens in comparison to other electronic tokens. In embodiments, the allocation parameters may include allocating electronic tokens in a particular aggregation (e.g., portfolio) that includes other electronic tokens. In embodiments, the other parameters may include information about the basis of the electronic token associated with generated graphical and alphanumeric information displayed via a graphical user interface. In embodiments, the other parameters may include information about generating one or more electronic profiles (e.g., electronic profile, electronic aggregation, etc.).

At step 610, user device 112 and/or electronic application 116 may generate graphical user interface features. In embodiments, the graphical user interface features may include line graphs, block graphs, pie charts, columns, rows, icon features, and real-time online electronic information feeds associated with different types of electronic tokens as electronic information about the electronic tokens changes. In embodiments, the electronic tokens may be generated by a blockchain generated by another server, server 118, or system 120. In embodiments, the line graphs, block graphs, and/or pie charts may automatically change in shape and values over a period of time. In embodiments, multiple types of graphs may simultaneously change based on changing values of one or more electronic tokens. In embodiments, the graphical and alphanumeric information may be updated with electronic communications associated with multiple users. For example, users associated with a social network (e.g., an electronic application that allows different users to share photos) may electronically generate information that automatically and in real-time is analyzed by electronic application 116 (and associated graphical user interface) to generate an output that can be used to conduct electronic transactions of one or more different types of electronic tokens. Accordingly, the graphical user interface features, as displayed, electronically change in shape based on electronic communications from another electronic application.

Figure 7:
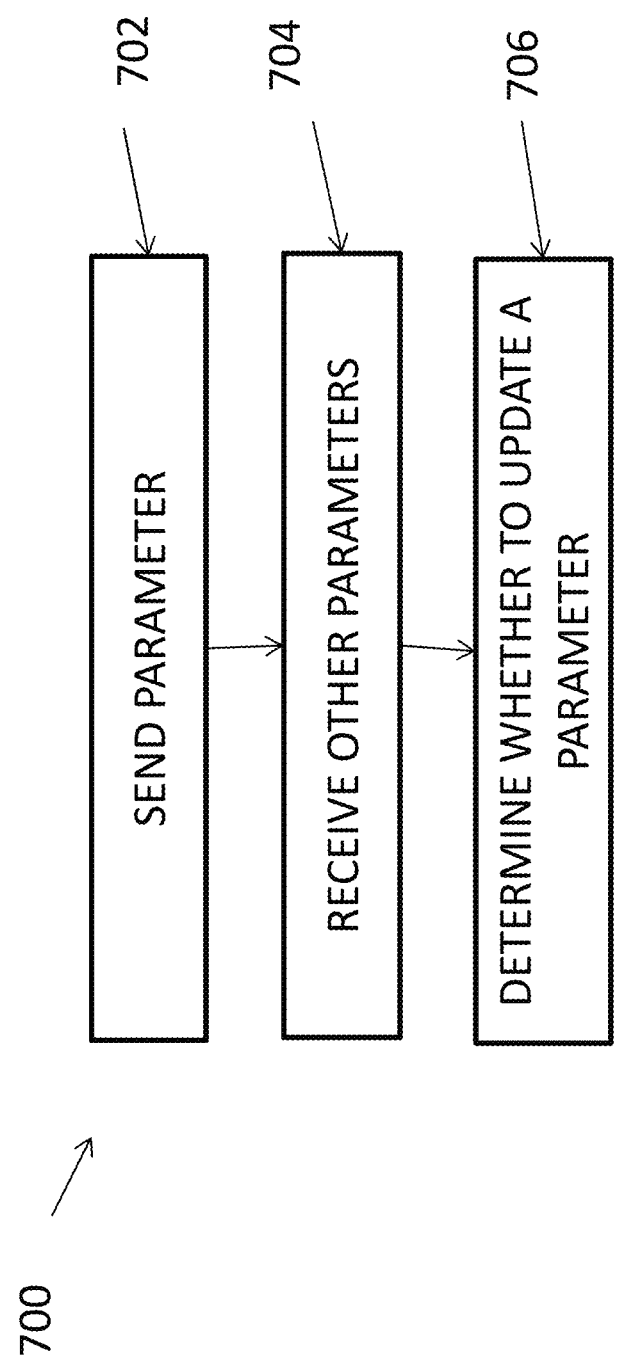
FIG. 7 is a flow chart of an example process for updating communication features.

FIG. 7 is a flow chart of an example process 700 for updating parameters associated with a graphical user interface. In embodiments, example process 700 may be performed by electronic application 116, user device 112, and/or server 118. At step 702, user device 112 and/or electronic application 116 may send a parameter to another type of electronic application associated with a server (e.g., server 122) other than server 118. In embodiments, the parameter may be sent to the other type of electronic application based on the user of electronic application 116 to make their electronic information public. In embodiments, the parameter may be sent automatically or based on a specific command. In embodiments, the parameter may be an electronic token parameter, a time period parameter, a quantity parameter, an allocation parameter. For example, an electronic token parameter may include information about the type of electronic token. Furthermore, for example, a time period parameter may include information about the period of time associated with holding the type of electronic token. The quantity parameter may include information about the amount of electronic token (e.g., 1, 100, 1,000, etc.). In addition, for example, the allocation parameter may include information about the allocation of a token to a particular aggregation that includes different electronic tokens.

At step 704, user device 112 and/or electronic application 116 may receive the other parameters. In embodiments, the other parameters may include information that may change one or more features associated with a graphical user interface. In embodiments, user device 112 and/or electronic application 116 may receive the other parameters, via server 118, from another user device (e.g., user device 112) using another electronic application. In embodiments, the other parameters may include electronic information about changing a time period, changing allocation information, changing electronic communications regarding initial coin offerings (ICOs), and/or other information. In embodiments, user device 112 and/or electronic application 116 may also receive electronic information about electronic tokens from another identifier associated with electronic application 116, based on electronic communications between the other electronic application and electronic application 116.

At step 706, user device 112 and/or electronic application 116 may determine whether to update a parameter. In embodiments, user device 112 and/or electronic application 116 may determine whether one or more received other parameters (such as described in step 704) should be used to update graphical user interface features associated with a particular identifier associated with electronic application 116. In embodiments, user device 112 and/or electronic application 116 may determine whether a time period, changes to allocation information, and/or changes to any other information would increase the amount of electronic tokens associated with a particular identifier (with electronic application 116). In embodiments, electronic application 116 may automatically determine the update based on previous electronic transactions or the update to the graphical user interface may be initiated by the user. Accordingly, one user using one type of electronic application, different than electronic application 116, may update graphical user interface features associated with a particular identifier with electronic application 116. In embodiments, user device 112 and/or electronic application 116 may analyze whether updating a parameter may increase or decrease a particular electronic value. In embodiments, if updating a parameter increases a particular electronic value, electronic application 116 may change a graphical user interface feature.

Figure 8:
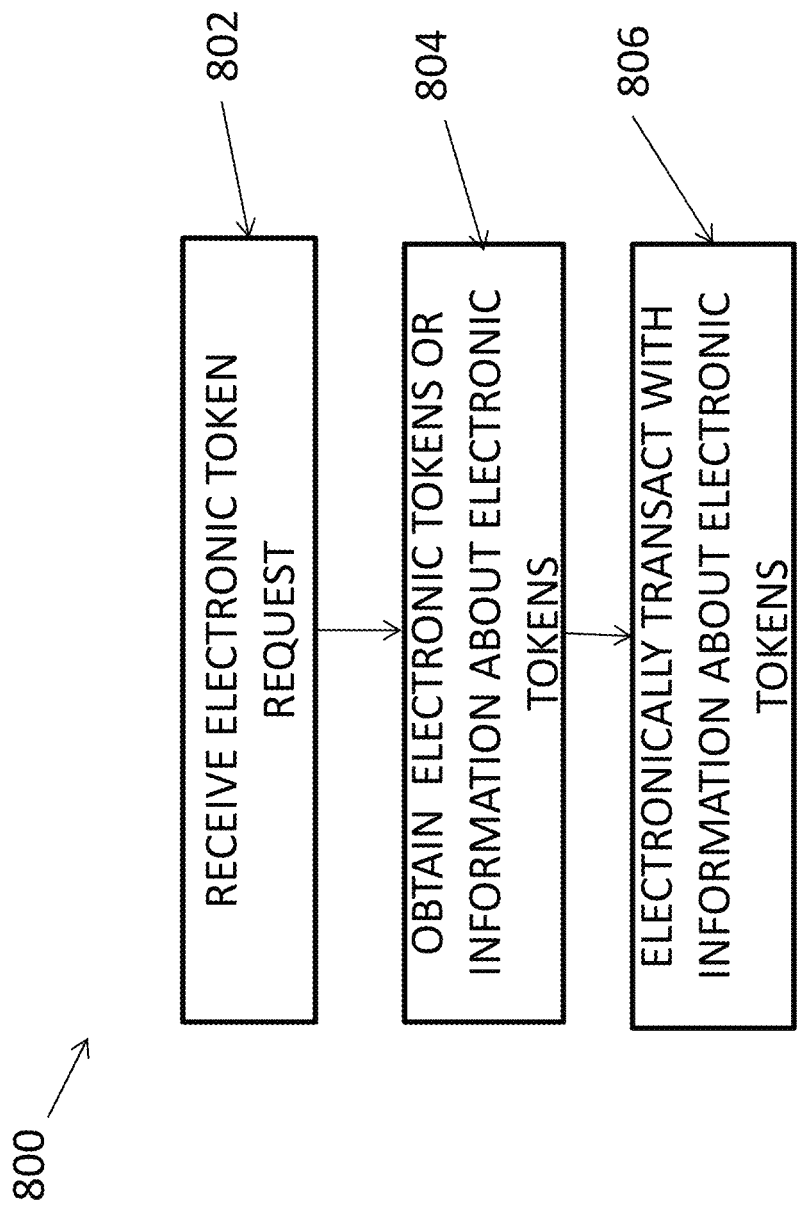
FIG. 8 is an example process associated with electronic token parameters.

FIG. 8 is a flow chart of an example process 800 for receiving electronic information for electronic tokens (that may be associated with system 120 or with server 122) or generating electronic tokens associated with electronic application 116. In embodiments, example process 800 may be performed by server 118 and/or system 120. At step 802, server 118 and/or system 120 may receive an electronic token request which is for information about electronic tokens or generating electronic tokens. In embodiments, the electronic token request may be received from user device 112 and/or electronic application 116. At step 804, server 118 and/or system 120 may electronically receive information about one or more electronic tokens. In embodiments, upon receiving the receiving the request in step 802, server 118 and/or system 120 may have electronic permission (e.g., password, access to protocols, etc.) included in the request to electronically receive information about electronic tokens associated with a blockchain without any requirement to electronically transact with the blockchain. In alternate embodiments, upon receiving the request, server 118 and/or system 120 may generate electronic tokens or server 118 may send a request to server 122 to generate electronic tokens. At step 806, server 118 and/or system 120 may generate electronic communications that allow for user device 112 and/or electronic application 116 to electronically interact with electronic information about the electronic tokens for generating different graphical user interface displays of the electronic tokens. In embodiments, the electronic tokens may then be electronically associated with a graphical user interface and may be used to change one or more features of the graphical user interface based on changes occurring to the electronic tokens.

FIG. 9 describes an example data structure 900 that stores electronic information associated with a graphical user interface and electronic application 116. In embodiments, data structure 900 may include a collection of fields such as ID 902, Privacy Level 904, Token Type 906, and Social Networks 908. Although FIG. 9 shows example fields 902-908, in other embodiments, data structure 900 may include fewer fields, different fields, additional fields, and/or differently arranged fields than depicted in FIG. 9. In embodiments, user device 112 and/or electronic application 116 may store some or all of data structure 900. Additionally, or alternatively, server 118 and/or system 120 may store some or all of data structure 900.

In embodiments, ID 902 may store information about particular identifiers for different users associated with electronic application 116. In embodiments, Privacy Level 904 may store information about whether graphical user interface features for a particular identifier should be public or private. In embodiments, Privacy Level 904 may store information that all the graphical user interface features should be public, private, or a portion of the graphical user interface feature is private (e.g., 50% private). In embodiments, Token Type 906 may include information about different types of electronic tokens that are associated with one or more graphical user interface features associated with electronic application 116. In embodiments, the electronic tokens may be generated by another server (e.g., server 122) and associated with a blockchain. In embodiments, server 118 or system 120 may obtain electronic information about the electronic tokens from the blockchain without changing the number of transaction or blocks within the blockchain. In alternate embodiments, electronic tokens may be generated by server 118, system 120, or other servers and systems. In embodiments, Token Type 806 may be associated with electronic tokens that are a type of bitcoin or other type of cryptocurrency. In embodiments, Social Networks 908 may include information about other electronic applications or websites that receive electronic communications associated with one or more graphical user interface features. In embodiments, Social Networks 908 may include electronic applications and/or websites that may not allow for electronic transactions of electronic tokens. In alternate embodiments, Social Networks 908 may include electronic applications and/or websites that allow electronic transactions to electronically display photos, multimedia, and/or other content, and electronic transactions of electronic tokens. As shown in FIG. 9, if Privacy Level 904 is private, then no electronic communications associated with the graphical user interface are sent to other electronic applications or other websites.

Figure 10A:
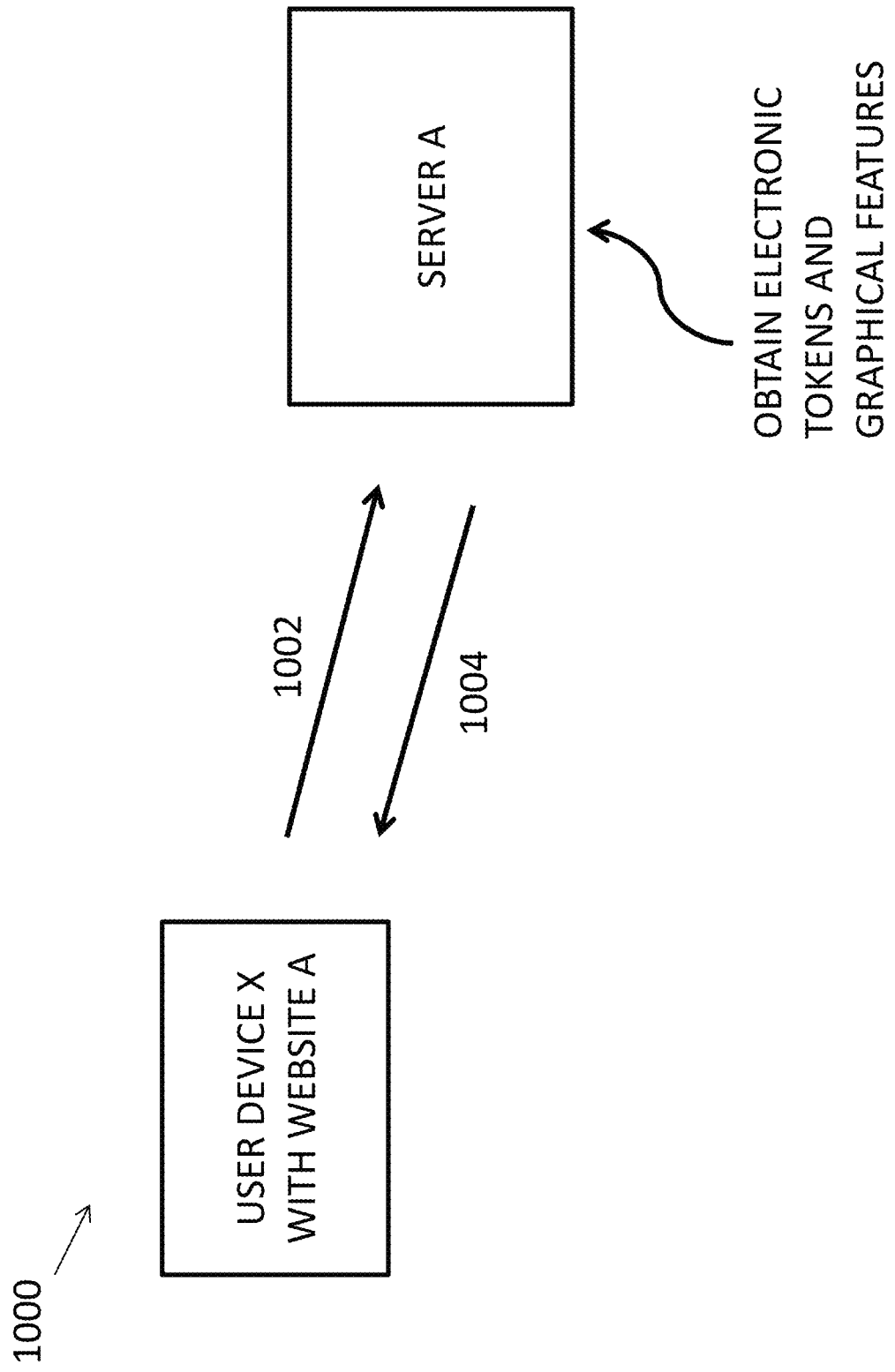
FIGS. 10A-10C are example electronic communications between one or more types of electronic applications.
Figure 10B:
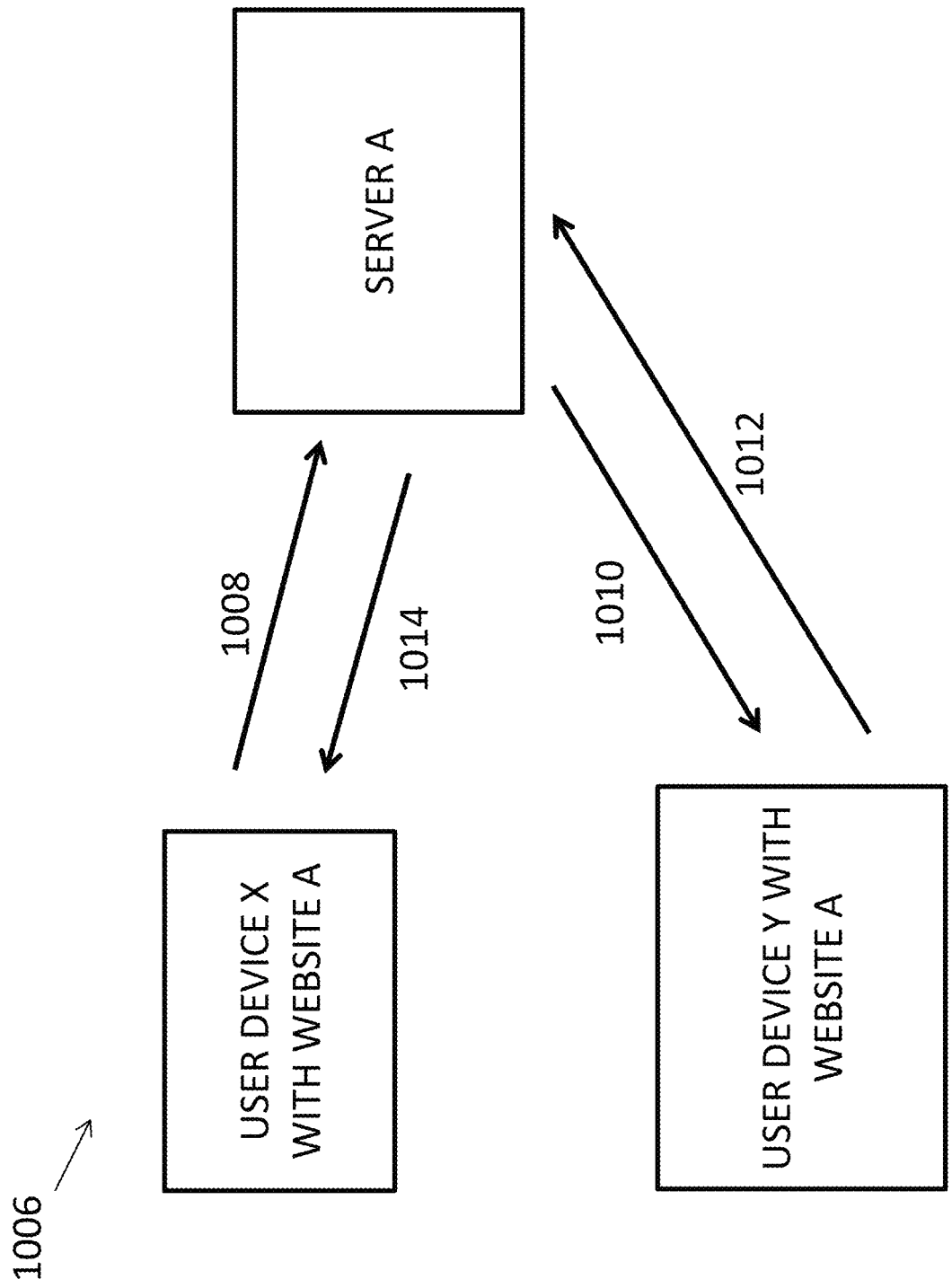
Figure 10C:
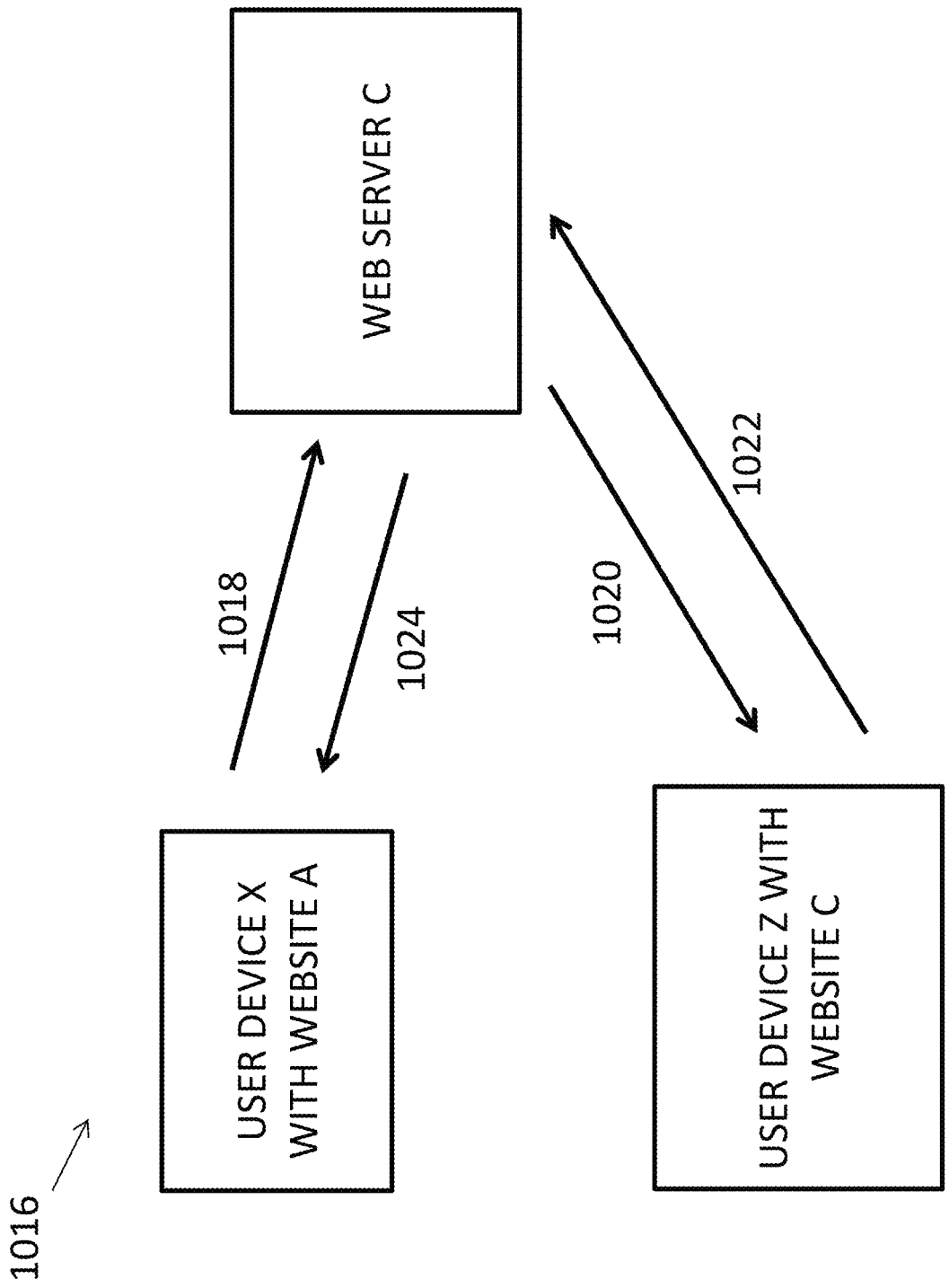

FIGS. 10A-10C are example electronic communications processes (1000, 1006, and 1016) between one or more types of electronic applications and/or computing devices. As shown in FIG. 10A, User Device X (e.g., user device 112) is being used to access Website A. As shown in FIG.

10A, electronic communication 1002 is sent from Website A (via User Device X) to Serve A. In embodiments, electronic communication 1002 may include a request for electronic tokens and/or electronic information associated with a time period, graphical features, and allocation information related to the electronic tokens. As shown in FIG. 10A, server A receives electronic communication 1002 and obtain electronic information about tokens from a blockchain or other type of peer-to-peer system, and, furthermore, generates graphical features for the generated electronic information associated with Website A. In embodiments, electronic tokens are bitcoins or another type of cryptocurrency. Alternatively, server A may generate electronic tokens. As shown in FIG. 10A, server A sends, electronic communication 1004, that may include electronic information about tokens, electronic tokens, and/or graphical features to Website A via User Device X.

In FIG. 10B, at a later time, electronic communication 1008 is sent from Website A, via User Device X, to Server A. In embodiments, electronic communication 1008 includes one or more graphical user interface features for a particular identifier associated with Website A. In embodiments, electronic communication 1008 may be sent if a user has classified the one more graphical user interface features as public. As shown in FIG. 10B, Server A may send electronic communication 1010 to Website A as displayed on User Device Y. Accordingly, a different user (associated with User Device Y) may electronically receive electronic information associated with the user of User Device X. As shown in FIG. 10B, User device Y may send electronic communication 1012 to Server A. In embodiments, electronic communication 1012 may include electronic information that can be used to electronically change one or more graphical features associated with an identifier for a user using User Device X. In embodiments, Server A may send electronic communication 1014 to User Device X. In embodiments, electronic communication 1014 may include electronic information that can be used to electronically change one or more graphical features associated with an identifier for a user using User Device X. While FIG. 10B shows Server A as an intermediate device for communications between User Device X and Y, User Devices X and Y may directly electronically communicate with each other without Server A.

In FIG. 10C, electronic communication 1018 is sent from Website A, via User Device X, to Web Server C. In embodiments, electronic communication 1018 includes one or more graphical user interface features for a particular identifier associated with Website A. In embodiments, electronic communication 1018 may be sent if a user has classified the one more graphical user interface features as public. As shown in FIG. 10C, Web Server C may send electronic communication 1020 to Website C as displayed on User Device Z. Accordingly, a different user (associated with User Device Z) may electronically receive electronic information associated with the user of User Device X. As shown in FIG. 10C, User device Z may send electronic communication 1022 to Web Server C. In embodiments, electronic communication 1022 may include electronic information that can be used to electronically change one or more graphical features associated with an identifier for a user using User Device X. In embodiments, Web Server C may send electronic communication 1024 to User Device X. In embodiments, electronic communication 1024 may include electronic information that can be used to electronically change one or more graphical features associated with an identifier for a user using User Device X. While FIG. 10C shows Web Server C as an intermediate device for communications between User Device X and Z, User Devices X and Z may directly electronically communicate with each other without Web Server C.

Figure 11:
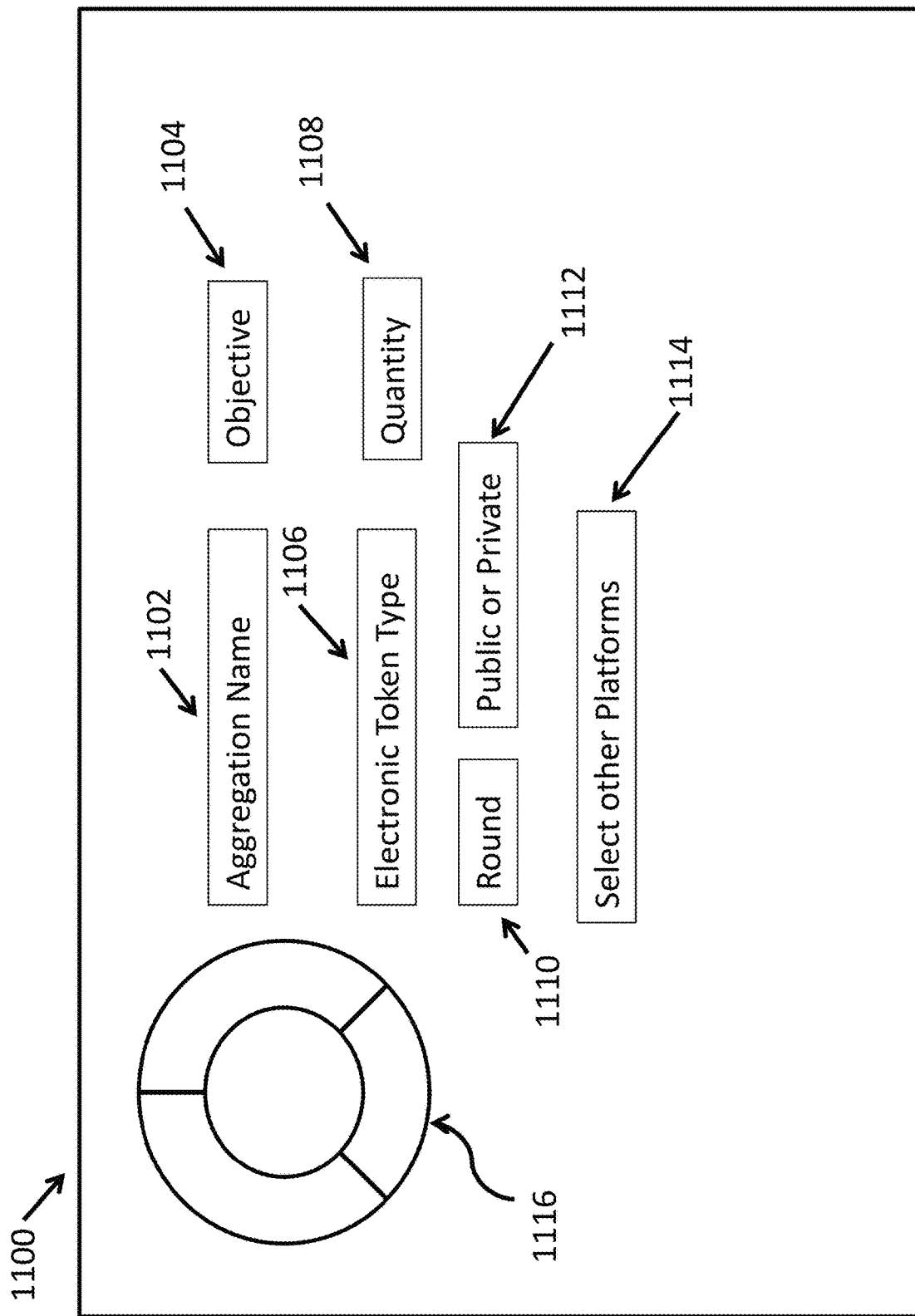
FIG. 11 is an example electronic graphical user interface.

FIG. 11 shows an example electronic graphical user interface 1100 for entering information. In embodiments, electronic graphical user interface 1100 is generated by electronic application 116, server 118, and/or system 120 and includes aggregation name 1102, objective 1104, electronic token type 1106, quantity 1108, round 1110, public or private 1112, select other platforms 1114, and graph 1116. In embodiments, 1102 to 1114 may be icons, buttons, and/or other graphical user input features that allow a user to electronically input information into electronic application 116. In embodiments, aggregation name 1102 allows for entering alphanumeric information that defines a particular aggregation (e.g., portfolio). In embodiments, objective 1104 may include information that can be entered or selected from a menu that determines future changes in electronic token values over a period of time. In embodiments, objective 1104 may determine a number of future electronic communications between different users. In embodiments, electronic token type 1106 may include information about a particular electronic token that has its quantity over a period of time graphically displayed. In embodiments, particular selections for electronic token type 1106 may result in electronic application 116, server 118, and/or system 120 in electronically generating the electronic token. In embodiments, electronic token type 1106 may be selected more than once and a number of different electronic tokens can be selected.

In embodiments, quantity 1108 may include a quantity for electronic tokens that are selected in electronic token type 1106. In embodiments, round 1110 may include result in an electronic communication that changes the selected quantity of electronic token to a whole number value. For example, if 110.44 is a number of electronic tokens are selected, selection of round 1110 may change 110.44 to 110. In embodiments, public or private 1112 may include one or more electronic communications that determine whether the electronic information inputted and/or generated by electronic application 116 is electronically communicated to other users associated with electronic application 116 or other electronic applications. In embodiments, a particular user may have multiple aggregates and may select a number of aggregates to be private and another number of aggregates to be public.

In embodiments, select other platforms 1114 may include an option to determine which other types of electronic applications may receive electronic graphical information associated with a particular user and a particular aggregate. In embodiments, graph 1116 may include a graphical feature which displays an aggregate of different electronic tokens that are selected by a user of electronic application 116. In embodiments, graph 1116 may be shown a pie-chart format (as shown in FIG. 11) or may be shown in other graphical formats. While FIG. 11 shows one graph 1116, electronic application 1116 may electronically display multiple graphical features that change synchronously and in real-time. In embodiments, the changes to one or more graphical features, such as graph 1116, may be based on electronic communications with other electronic applications (e.g., associated with server 118).

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. Also it will be understood that any of the various actions can result in any type of electronic information to be displayed in real-time and/or simultaneously on multiple user devices (e.g., similar to user device 124). For FIGS. 5, 6, 7, and 8 the order of the blocks may be modified in other implementations. Further, non-dependent blocks may be performed in parallel. Also, it will be understood that any electronic post may include information about services and other information that may include user-generated and non-user generated text, numbers, photos, animation, multimedia content, and/or any other type of electronic content that can be analyzed for any of the reasons described in the above figures. It will be understood that an electronic post may be an advertisement, an electronic message, a text message, a SMS message, a MMS message, and/or any other electronic generated content (user and non-user) that can be electronically displayed on a user device screen. While the systems, methods, or processes described herein are in association with electronic video content, the systems, methods, or processes described herein may be used to electronically (or non-electronically) post or view other types of content (e.g., audio content, textual content, images, etc.).

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
  receiving, by an electronic application, first electronic information from a first blockchain,
    wherein receiving the first electronic information does not add an additional block to the first blockchain and does not result in an electronic action upon the first blockchain,
    wherein the first electronic information is about a quantity of first electronic tokens;
  receiving, by the electronic application, second electronic information from a second blockchain,
    wherein receiving the second electronic information does not add another block to the second blockchain,
    wherein the second electronic information is about a quantity of second electronic tokens,
      wherein the first electronic information and the second electronic information change at different rates over a period of time;
  generating, by the electronic application, graphical features,
    wherein the graphical features combine the first electronic information and the second electronic information and the graphical features show the changes to the first electronic information over the period of time;
  sending, by the electronic application, the first electronic information and the second electronic information to a second electronic identifier associated with an electronic social networking application, based on the first electronic information, and the second electronic information being made public,
    wherein the first electronic identifier and the second electronic identifier can electronically post information via the electronic social networking application;
  sending, by the electronic application, an allocation parameter to the electronic social networking application;
  receiving, by the electronic application, electronic instructions that change the allocation parameter;
  changing, by the electronic application, the first or second electronic information based on the changes to the allocation parameter; and
  changing, by the electronic application, the graphical features based on the changes to the allocation parameter, wherein the changes to the graphical features occur in real-time and simultaneously with the changes made in the electronic social networking application to the allocation parameter.

2. The electronic communications method of claim 1, where the graphical features include at least one of:
  a pie chart,
  a line chart,
  and a block chart,
  wherein at least one of the pie chart, the line chart, and the block chart electronically changes based on the changes to the quantity of first electronic tokens and the quantity of second electronic tokens.

3. The electronic communications method of claim 1, where the graphical features include:
  a unique identification name for the aggregated information;
  an electronic objective electronic graphical feature that displays planned information about the aggregated information; and
  electronic token types.

4. The electronic communications method of claim 1, where the graphical features include electronic hyperlinks that are associated with electronic transactions that change different types of the graphical features.

5. The electronic communications method of claim 1, where the graphical features include an electronic icon that can change a value associated with the first quantity of electronic tokens with a fractional value to another value with no fractional value.

6. The electronic communications method of claim 1, where the graphical features include multimedia content.

7. The electronic communications method of claim 1, wherein the electronic application acts as an electronic interface between the electronic social networking application and:
- a first blockchain electronic application, wherein the first blockchain electronic application sends the first electronic information to the electronic application which then sends the first electronic information to the electronic social networking application, and
- a second blockchain electronic application, wherein the second blockchain electronic application sends the second electronic information to the electronic application which then sends the second electronic information to the electronic social networking application.

8. An electronic communications method, comprising:
receiving, by a computing device, first electronic information from a first blockchain,
 wherein receiving the first electronic information does not result in an electronic action upon the first blockchain,
 wherein the first electronic information is about a quantity of first electronic tokens;
receiving, by the computing device, second electronic information from a second blockchain,
wherein receiving the second electronic information does not add another block to the second blockchain and does not result in another electronic action upon the second blockchain,
 wherein the second electronic information is about a quantity of second electronic tokens,
  wherein the first electronic information and the second electronic information change at different rates over a period of time;
electronically aggregating, by the computing device, the first electronic information and the second electronic information into a third electronic information without changing the first blockchain and the second blockchain;
generating, by the computing device, graphical charts, wherein the graphical charts show the changes to the first electronic information over the period of time;
receiving, by the computer device, a privacy parameter that indicates that a portion of the third electronic information is made public;
sending, by the computing device, the portion of the third electronic information to a second electronic identifier based on the portion of the third electronic information being made public;
sending, by the computing device, an allocation parameter and a time period parameter to an electronic social networking application;
receiving, by the computing device, electronic instructions that change the allocation parameter;
changing, by the computing device, the portion of the third electronic information made public based on the changes to the allocation parameter,
 wherein the changes to the allocation parameter and the time period parameter changes the quantity of the first electronic tokens and the quantity of the second electronic tokens; and
changing, by the computing device, the graphical charts based on the changes to the allocation parameter, wherein the changes to the graphical charts occur simultaneously with the changes made in the electronic social networking application to the allocation parameter.

9. The electronic communications method of claim 8, wherein a part of the third electronic information made private is made private and is not sent the electronic social networking application.

10. The electronic communications method of claim 9, wherein the changes to the graphical charts do not change based on the third electronic information made private.

11. The electronic communications method of claim 8, wherein the computing device interacts with cryptologic information from a first blockchain electronic application and a second blockchain electronic application without sending the cryptologic information from the first blockchain electronic application and the second blockchain electronic application to the electronic social networking application.

12. The electronic communications method of claim 8, wherein the electronic social networking application sends the third electronic information made public to other electronic identifiers and receives multiple parameters from the other electronic identifiers that are used to change the graphical charts generated by the electronic application.

13. The electronic communications method of claim 8, where the graphical features include:
- a unique identification name for the aggregated information;
- an electronic objective electronic graphical feature that displays planned information about the aggregated information; and
- electronic token types,
wherein an electronic round-up graphical feature that changes fractional value information of a particular electronic token to whole value information, and the graphical charts include an electronic pie chart with areas that change in size based on changes to the quantity of first electronic tokens and the quantity of second electronic tokens.

14. The electronic communications method of claim 8, further comprising:
generating, by the computing device, a third blockchain that is associated with a quantity of third electronic tokens that can be aggregated with the quantity of first electronic tokens and the quantity of second electronic tokens without adding any additional blocks to the first blockchain and the second blockchain.

15. An electronic computing device, comprising:
a memory, and
a processor, coupled to the memory, to:
 generate an electronic interface between an electronic social networking application and:
 a first peer-to-peer electronic application, and
 a second peer-to-peer electronic application,
 receive first electronic information from a first blockchain associated with the first peer-to-peer electronic application,
  wherein the electronic interface interacts with cryptologic information from the first peer-to-peer electronic application without sending the cryptologic information to the electronic social networking application,
  wherein receiving the first electronic information does not add an additional block to the first blockchain and does not result in an electronic action upon the first blockchain, and wherein the first electronic information is about a quantity of first electronic tokens;

receive second electronic information from a second blockchain associated with the second peer-to-peer electronic application, wherein receiving the second electronic information does not add another block to the second blockchain, wherein the second electronic information is about a quantity of second electronic tokens, generate graphical features, wherein the graphical features show the changes to the first electronic information over a period of time;

send the first electronic information to a second electronic identifier associated with the electronic social networking application, based on the first electronic information and the second electronic information, being made public, wherein the second electronic identifier is different than the first electronic identifier, send an allocation parameter;

receive electronic instructions that change the allocation parameter; and change the graphical charts based on changes to the allocation parameter, wherein the changes to the graphical charts occur in real-time.

16. The electronic computing device of claim 15, wherein the graphical features include:

a unique identification name for the aggregated information.

17. The electronic computing device of claim 16, wherein the graphical features include an electronic round-up graphical feature that changes fractional value information of a particular electronic token.

18. The electronic computing device of claim 15, wherein the electronic application interacts with cryptologic information from the first peer-to-peer electronic application without sending the cryptologic information to the electronic social networking application.

19. The electronic computing device of claim 18, wherein the electronic application prevents the electronic social networking application from making changes to any blockchains in the first peer-to-peer electronic application and any other blockchains in the second peer-to-peer electronic application.

\* \* \* \* \*